May 22, 1923.
G. H. LANTZ
1,456,066
RESILIENT VEHICLE WHEEL
Filed Sept. 11, 1919
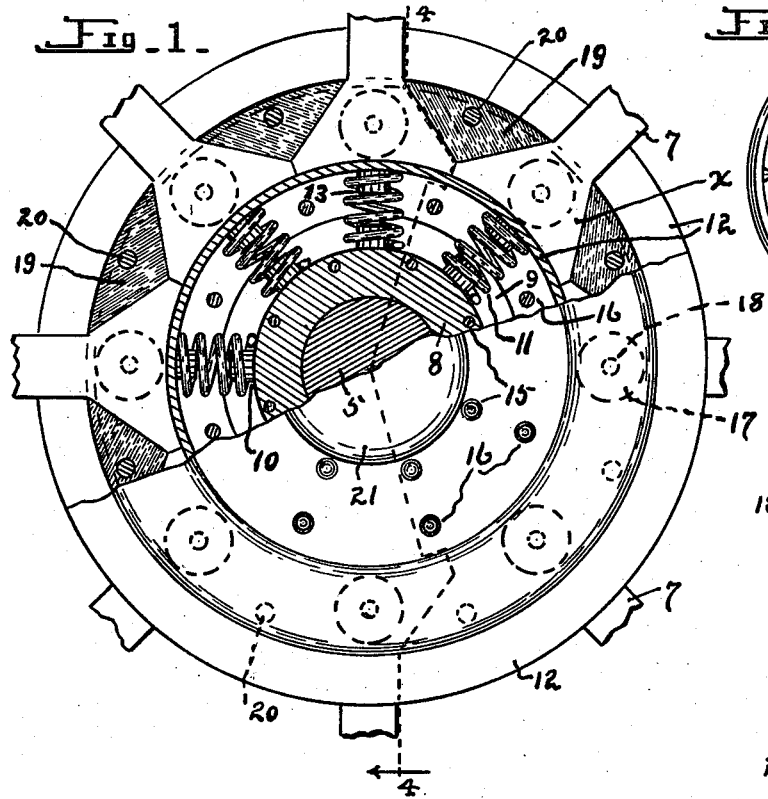
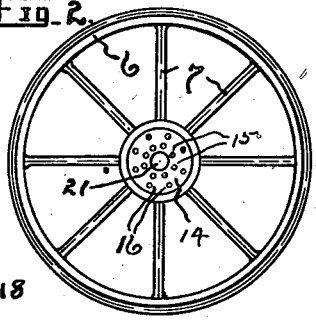
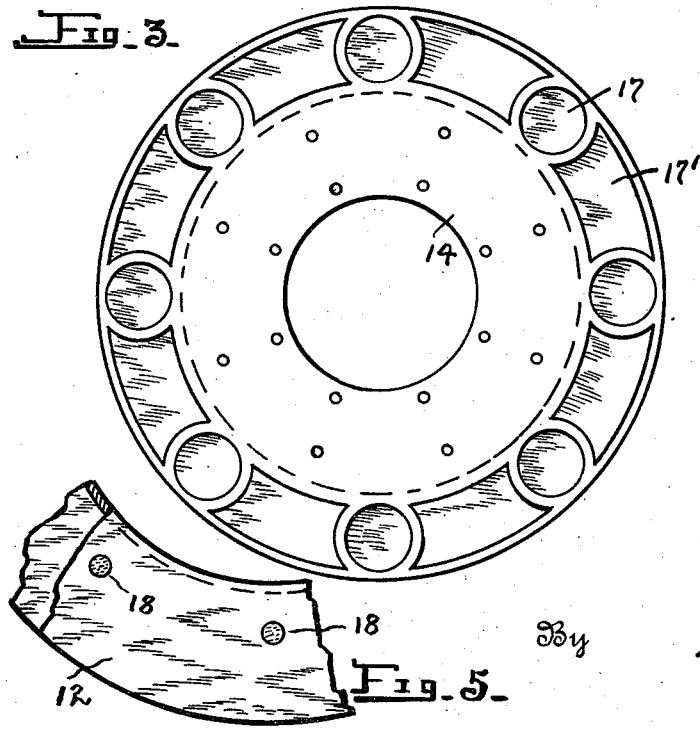
Inventor
George H. Lantz
By Hiram A. Sturges,
Attorney Patented May 22, 1923.

1,456,066

UNITED STATES PATENT OFFICE.

GEORGE H. LANTZ, OF OMAHA, NEBRASKA.

RESILIENT VEHICLE WHEEL.

Application filed September 11, 1919. Serial No. 323,178.

*To all whom it may concern:*

Be it known that I, GEORGE H. LANTZ, a citizen of the United States, residing at Omaha, in the county of Douglas and State of Nebraska, have invented certain new and useful Improvements in a Resilient Vehicle Wheel, of which the following is a specification.

This invention relates to a resilient vehicle wheel, and has for its object to provide wheels for use upon automobiles, motor trucks or other like vehicles, said wheels to be provided with springs for absorbing shocks, jolts and vibrations, and thereby to dispense with the air-inflated, inner tubes generally constructed of rubber and used for that purpose, and also to dispense with rubber tires or casings which are comparatively expensive. Another object is to provide a construction which will require few and simple parts so that the wheels will be durable and may be economically manufactured.

The invention consists of the novel construction, combination and arrangement of parts as described herein and claimed, and as illustrated in the accompanying drawing, wherein,—

Fig. 1 is a broken away view, partly in section, showing a wheel axle and parts adjacent thereto. Fig. 2 is a view of a vehicle wheel in side elevation. Fig. 3 is a view showing the inner side of an annular bearing-plate. Fig. 4 is a sectional view on line 4—4 of Fig. 1. Fig. 5 is a view showing a part of a circular spoke-holder.

Referring now to the drawing for a more particular description, the invention is shown in connection with a wheel-axle 5, the tire and spokes therefor being respectively indicated at 6 and 7.

In order that shocks and vibrations incident to the use of the vehicle wheel may be practically eliminated, I provide a sleeve or hub-member 8, provided with a screw-cap 21 and a pair of radially disposed, circular flanges 9, between these flanges being disposed a plurality of projections 10 which extend radially from the sleeve for a mounting thereon of spiral springs 11, any suitable number of these projections and springs being provided, depending upon the weight to be sustained or the class of vehicle to which the wheels are to be applied.

Numeral 12 indicates an annular spoke-holder approximately of U-shape in cross-section, provided with inwardly extending projections 13 for a mounting thereon of the outer ends of the springs 11; and at 14 are indicated a pair of annular bearing-plates adapted to engage the sides of the annular spoke-holder and also adapted to engage the hub 8 and flanges 9, said bearing-plates being secured to the hub by numerous bolts 16, the latter being disposed between the springs 11, said bearing-plates being provided with recesses 17 and 17′ opening on their inner sides; and disposed in each recess 17 of each bearing-plate 14 is a lug 18, said lugs being mounted in the parallel, opposed walls of member 12, the recesses 17′ having no function except to provide a comparatively light weight for the plate 14.

As thus described, the weight sustained by the axle will cause the springs nearest to the lower part of the wheel tire to be compressed, the springs near the upper part of the wheel tire being retracted, the lugs 18 moving in the recesses 17, and the springs operating to prevent undue shocks and vibrations, the spokes being provided with outwardly divergent terminals *x* and being maintained in fixed relation with the holder 12 by means of spacing-blocks 19, and the latter being secured to the side walls of the spoke-holder by bolts 20.

According to the present construction, the annular spoke-holder 12 may have slidable movements between the plates 14, subject to the resistance of the springs, the triangular shaped blocks 19 and spokes moving therewith. It will be appreciated that the spokes will not become unduly worn since the side walls of member 12 will engage said plates; and removal of the spokes may be effected by removing the blocks 19.

It is considered that the flanges 9 and blocks 19 may be dispensed with in some instances, depending upon the weight to be sustained by the vehicle, diameter of the wheels and number of spokes. While I have described construction in detail I do not wish to be understood as limiting myself in this respect, and form, size, proportion and minor details may be changed, as found to be of advantage, said changes being determined by the scope of the invention as claimed.

What I claim as my invention and desire to secure by Letters Patent is,—

The combination with an axle provided with a hub, of a pair of connected, annular bearing-plates outwardly of and secured to the hub, each being provided with a circular chamber opening on its inner side, spiral springs between the bearing-plates in engagement with the hub, an annular spoke-holder approximately of U-shape in cross-section between the bearing-plates and having its bottom in engagement with the springs, spokes having inwardly divergent terminals engaging each other and engaging the bottom of the annular spoke-holder, bolts traversing the side walls of the spoke-holder and inwardly divergent terminals of the spokes and having end portions entering and normally disposed centrally of the circular chambers of the bearing-plates, spacing-blocks approximately of V-shape between and engaging the inwardly divergent terminals of the spokes, and pins traversing the sides of the annular spoke-holder and the spacing-blocks, said annular spoke-holder having bearings on the sides of the spokes outwardly of the inwardly divergent terminals thereof.

In testimony whereof, I have affixed my signature in presence of two witnesses.

GEORGE H. LANTZ.

Witnesses:
 HIRAM A. STURGES,
 MYRON L. DAVIS.